UNITED STATES PATENT OFFICE.

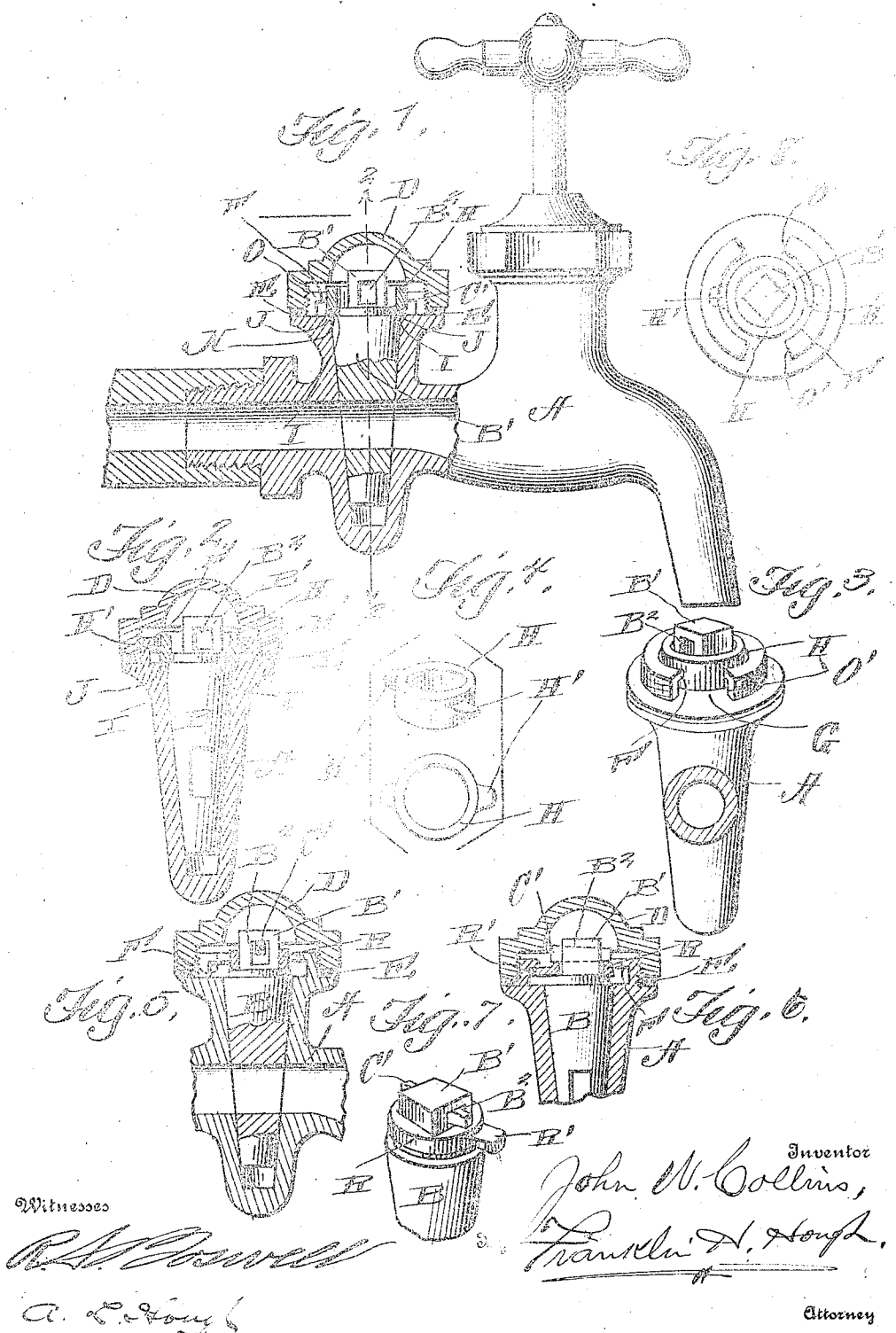

JOHN W. COLLINS, OF WASHINGTON, DISTRICT OF COLUMBIA.

VALVE FOR FAUCETS, PIPES, &c.

No. 903,175.

Specification of Letters Patent.

Patented Nov. 10, 1908.

Application filed June 11, 1907. Serial No. 378,434.

*To all whom it may concern:*

Be it known that I, JOHN W. COLLINS, a citizen of the United States, residing at Washington, District of Columbia, have invented certain new and useful Improvements in Valves for Faucets, Pipes, &c.; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in valves for faucets, pipes, etc., and consists essentially in the provision of means for holding a plug valve seated to prevent any leakage about the valve.

My invention comprises various details of construction and combinations and arrangements of parts which will be hereinafter fully described and then specifically defined in the appended claims.

My invention is illustrated in the accompanying drawings, in which:—

Figure 1 is a vertical sectional view through the faucet, showing the plug valve mounted therein. Fig. 2 is a vertical sectional view on line 2—2 of Fig. 1. Fig. 3 is a detail perspective view. Fig. 4 is a detail perspective view. Fig. 5 is a detail sectional view through the valve and casing. Fig. 6 is a sectional view taken in a plane at right angles to the plane shown in Fig. 5, and Fig. 7 is an enlarged detail perspective view. Fig. 8 is a top plan view of the construction shown in Fig. 3.

Reference now being had to the details of the drawings by letter, A designates a faucet, the casing of which is adapted to receive a turning plug or valve B which is apertured as usual with valves of this character and a space left within the casing and below the plug whereby wear of valve may be taken up. Projecting from the top of the plug is a stem B' which is apertured as at B² for the reception of a locking key.

H designates a ring, a detail view of which is shown clearly in Fig. 4 of the drawings, and which has diametrically disposed lugs H' projecting from its circumference. Said ring is designed to rest jointly upon a shoulder I of the plug valve and a horizontally disposed shoulder J of the valve casing and, if desired, a washer N may be positioned underneath said ring. It will be noted upon reference to the drawings that the upper marginal edge F of the wall surrounding the plug receiving opening of the casing is undercut or overhangs the opening, affording means whereby the lugs of the ring may engage the same for the purpose of holding the valve seated. Said undercut or overhanging portion of the wall has an opening G formed therein for the reception of the lugs H' which engage the overhanging portion in the manner shown in Fig. 2 of the drawings when the plug is given a partial rotary movement after being inserted in place.

D designates a threaded cap designed to fit over the opening in the casing in which the plug valve is seated and the threads of said cap engage the threads formed upon the circumference of the upright portion of the casing, as shown clearly in the drawings. A suitable washer E rests upon the shouldered portion of the casing and against which the cap is designed to screw to make a water tight joint.

In Figs. 5 and 7 of the drawings, I have shown a slight modification of the invention, in which the plug valve is provided with the usual stem B' apertured to receive a key C', and R designates a ring having a rectangular or square outlined opening adapted to fit over the stem B' and provided with a single laterally extending lug R', designed to turn underneath the overhanging wall of the valve casing.

From the foregoing, it will be noted that, by the means shown, a simple and efficient mechanism is afforded for holding a plug valve seated without having threaded connections between the plug and casing. The valve will be held closely against its seat and liquid prevented from passing about the sides of the plug, which is a common fault with various forms of turning plugs now in use. As an extra precaution, the cap may be screwed down over the plug against the shoulder of the casing, thereby keeping foreign matter from coming in contact with the valve and serving to prevent any leakage of water from the portion of the valve casing above the plug.

What I claim to be new is:—

1. In combination with a valve casing and turning plug valve therein, the upper portion of said casing having overhanging flanges at the top thereof, a loosely mounted ring resting jointly upon a shoulder of the plug valve and also of the casing and having projecting means adapted to engage underneath the flanges, and a closure fitted over the valve and engaging threads upon the casing, as set forth.

2. In combination with a valve casing and turning plug valve therein, the upper portion of said casing having overhanging flanges at the top thereof, a loosely mounted ring resting jointly upon a shoulder of the plug valve and also of the casing and provided with diametrically opposite lugs adapted to engage underneath said flanges, the upper end of the plug extending through said ring and apertured to receive a key, as set forth.

3. In combination with a valve casing and turning plug valve therein, the upper portion of said casing having overhanging flanges at the top thereof, a loosely mounted ring resting jointly upon a shoulder of the plug valve and also of the casing and extending above the upper edges of said flange, lugs projecting at points diametrically opposite on the ring and adapted to engage under said flanges, and a cap fitted over the top of the plug, as set forth.

In testimony whereof I hereunto affix my signature in the presence of two witnesses.

JOHN W. COLLINS.

Witnesses:
A. L. HOUGH,
ROBERT A. BOSWELL.